United States Patent [19]

Niegel

[11] Patent Number: 5,802,122
[45] Date of Patent: Sep. 1, 1998

[54] TRANSMISSION SYSTEM COMPRISING A MATCHING CIRCUIT

[75] Inventor: Michael Niegel, Lauf, Germany

[73] Assignee: Lucent Technologies, Inc., Murray Hill, N.J.

[21] Appl. No.: 308,056

[22] Filed: Sep. 16, 1994

[30] Foreign Application Priority Data

Sep. 25, 1993 [DE] Germany .......................... 43 32 761.3

[51] Int. Cl.⁶ ..................................................... H04L 7/00
[52] U.S. Cl. ............................ 375/372; 370/506; 370/516
[58] Field of Search .................................. 375/372, 371, 375/354; 370/505, 506, 516

[56] References Cited

U.S. PATENT DOCUMENTS

| 4,811,340 | 3/1989 | McEachern et al. | 375/372 |
| 4,996,698 | 2/1991 | Nelson | 375/372 |
| 5,263,056 | 11/1993 | Urbansk | 375/375 |

FOREIGN PATENT DOCUMENTS 4205959  9/1993  Germany .

Primary Examiner—Don N. Vo

[57] ABSTRACT

A transmission system includes a matching circuit (2) for equalizing frequency and/or phase variations between an incoming and an outgoing frame-synchronized signal. The matching circuit (2) includes a buffer memory (5) to buffer the data of the signal, a write address generator (6) generating cyclic write addresses to control the writing in the buffer memory (5), and a read address generator (7) generating cyclic read addresses to control the reading from the buffer memory (5). The read address generator is provided to generate, during a predefined structure of each frame of the outgoing signal, at least a double read address if a control signal indicates a positive justification action, and is provided to skip at least one read address if the control signal indicates a negative justification action. Furthermore, a phase detector (8) is provided to form a phase value from each read address and write address and a justification decision circuit (9) is provided to generate during each frame of the outgoing signal at least once the control signal that indicates a negative justification action if a phase value continues to be below a first threshold value, and indicates a positive justification action if the phase value exceeds a second threshold value which is higher than the first threshold value.

10 Claims, 2 Drawing Sheets

TRANSMISSION SYSTEM COMPRISING A MATCHING CIRCUIT

BACKGROUND OF THE INVENTION

The invention relates to a transmission system comprising a matching circuit for equalizing frequency and/or phase variations between an incoming and an outgoing frame synchronized signal.

From DE-A1-42 05 959 is known a matching circuit which generates an outgoing frame synchronized signal containing data and data gaps in that the circuit matches the data of an incoming STM-1 signal of the Synchronous Digital Hierarchy with a locally generated read clock and is used in a transmission system. The STM-1 signal is frame structured and contains control indication bits and justification data in addition to payload. An STM-1 frame comprises 270 columns and 9 rows (270 bytes per row). Rows 1 to 3 and 5 to 9 in the columns 1 to 9 contain the section overhead (SOH) for overhead bytes and error detection information and the rest of the structure (AU payload structure=AU-payload) contains data of the signal, justification data and further overhead bytes. Various different containers (C-4, C-3, C-2, C-12 and C-11) may be accommodated in the AU-payload. The SOH data are referenced data gaps.

From the incoming STM-1 signal (DE-A1-42 05 959) is derived a write clock signal which is applied to a write address generator which generator controls the writing in a buffer memory which also receives the STM-1 signal. Data of the incoming frame synchronized signal are further transferred to a synchronization circuit and a receiving frame counter which blocks the write address generator when data gaps occur (SOH data). A read address generator, which receives a read clock signal from a locally available clock generator and controls the reading from the buffer memory, is connected to a subtracter circuit as is the write address generator. The subtracter circuit subtracts the write address from the read address and applies a sequence of difference values to a comparator. If a difference value is smaller than a threshold value, the read address generator is blocked. The threshold value corresponds to a lower occupancy level of the buffer memory.

The blocking of the read address generator calls forth a positive justification action. A positive justification action is understood to mean the omission of payload at a position which otherwise does contain payload. A positive justification action is then necessary if the frequency of the read clock signal exceeds that of the write clock signal. A negative justification action is effected if the frequency of the read clock signal is smaller than that of the write clock signal. In the case of a negative justification action, payload is transmitted at a position which otherwise does not carry payload. A negative justification action can in prior-art circuit only occur during a data gap. A position containing an SOH data byte is then filled with a payload byte.

The matching circuit discussed in DE-A1-42 05 959 can only be used in a transmission system of the Synchronous Digital Hierarchy if the SOH data are not retransmitted.

SUMMARY OF THE INVENTION

Therefore, it is an object of the invention to provide a transmission system comprising a matching circuit of the type defined in the opening paragraph, in which frequency and/or phase variations between an incoming and an outgoing frame synchronized signal are equalized if, in essence, all the data are to be retransmitted.

In a transmission system comprising a matching circuit for equalizing frequency and/or phase variations between an incoming and an outgoing frame synchronized signal, this object is achieved in that the matching circuit comprises

- a buffer memory to buffer the data of the signal,
- a write address generator generating cyclic write addresses to control the writing in the buffer memory,
- a read address generator generating cyclic read addresses to control the reading from the buffer memory, which read address generator is provided to generate, during a predefined structure of each frame of the outgoing signal, at least a double read address if the control signal indicates a positive justification action and to skip at least one read address if the control signal indicates a negative justification action,
- a justification decision circuit coupled to the read and write address generators and provided to generate the control signal.

In the matching circuit of the transmission system according to the invention only the read address generator is controlled which is in contrast to the prior-art matching circuit. The data are written in the buffer memory by the write address generator which receives a write clock signal derived from the incoming frame synchronized signal and generates write addresses. The read address generator receives a read clock signal, for example, from a clock generator included in the transmission system. The reading of the data from the buffer memory is controlled by the read address generator which generates read addresses. The phase detector calculates the difference between the write and read addresses and produces a sequence of phase values.

During each frame of the outgoing signal there is at least one comparison of a phase value with a first and a second threshold value. The first threshold value which corresponds to a lower occupancy level of the buffer memory is smaller than the second threshold value which corresponds to the upper occupancy level of the buffer memory. If the phase value is smaller than the first threshold value, a control signal containing a negative justification indication byte is generated for the read address generator. If the second threshold value is exceeded, the control signal will point to a positive justification action. If neither the first threshold value is fallen short of nor the second threshold value is exceeded, the control signal indicates that no justification action is to take place.

The control signal is applied to the read address generator which skips at least one read address during a predefined frame structure if a negative justification action is indicated and generates at least a double read address if a positive justification action is indicated. In the event of a negative justification action at least one read address is skipped, so that a data information signal written in the buffer memory is not retransmitted. The predefined structure is to be selected such that if there is a negative justification action, no significant information (for example, a blank character) is lost or an evaluation of the information of this structure has already taken place. In the event of a positive justification action a read address is generated at least twice, so that there is an extra data position in the signal.

A device arranged downstream of the matching circuit may be informed of a justification action via an additional line. The control signal could be transferred as a justification indication byte.

If the justification decision circuit comprises a quantizer, this quantizer is to compare the phase value of each frame with the first or the second threshold value.

In order that the read address generator generates the read address generated most recently at least once more in the predefined structure of the frame of the outgoing signal if there is a positive justification action and, if there is a negative justification action, skips at least one read address, the predefined structure is to be recognized in the outgoing signal. For this purpose, there is a frame detection circuit which is provided to receive the outgoing frame synchronized signal and to detect the predefined structure. Such a frame detection circuit operates, for example, according to the same principle as the receiving frame counter known from DE-A1-42 05 959.

In order that the quantizer of the justification decision circuit generates the control signal resulting from a comparison of its two threshold values with a phase value only once in a frame, the frame detection circuit is provided to produce a release pulse for the quantizer in the predefined structure of a frame. The quantizer then forms the control signal when the release pulse occurs.

The justification indication byte can be transmitted to a device downstream in the circuit via a further line, as has been observed above. Alternatively, however, it is possible to accommodate the justification indication byte in an outgoing frame synchronized signal at the position not used for information signals. Such an interleaving of the justification indication byte in the outgoing frame synchronized signal can be realised by implementing the following measures:

A multiplexer is provided to receive the outgoing frame synchronized signal and a sequence of code words supplied by a coder, the coder to produce a sequence of code words from the control signal which indicates a positive, negative or no justification action, and the frame detection circuit to produce a switching pulse which pulse causes a code word to be transferred to the output of the multiplexer when a predetermined byte of a frame is available on an input of the multiplexer.

The phase detector includes a subtracter which is provided to receive read and write addresses and to form a sequence of phase values. The generation of the write addresses by the write address generator is coupled to the write clock and the generation of the read addresses by the read address generator is coupled to the read clock. As a rule, the write address is synchronized with the read clock prior to the subtraction i.e. the write address formed is written in a register in timing with the read clock. If a change of write address has occurred exactly at the instant of writing, the write address can often not be written correctly. For example, if a first bit position of the write address has already changed at the instant of writing, whereas a second bit position of the write address has not, there will be an erroneous address. In order to minimize this error, the write and read address generators are provided to form write and read addresses coded according to a one-bit code. Such a code is, for example, the Gray code.

If the frame synchronized signal is an STM-1 signal of the synchronous digital hierarchy, the predefined structure may be the first byte (1$^{st}$ column) in the 5$^{th}$ row of the STM-1 frame. This byte and the next two bytes contain information that has already been detected before.

The invention also relates to a matching circuit for equalizing frequency and/or phase variations between an incoming and an outgoing frame synchronized signal. The circuit comprises a buffer memory to buffer the data of the signal, a write address generator generating cyclic write addresses to control the writing operation in the buffer memory, a read address generator generating cyclic read addresses to control the reading from the buffer memory, which read address generator is provided to generate, during a predefined structure of each frame of the outgoing signal, at least a double read address if the control signal indicates a positive justification action and to skip at least one read address if the control signal indicates a negative justification action, a justification decision circuit which is provided to generate, during each frame of the outgoing signal, at least once a control signal which indicates a negative justification action if a phase value continues to be below a first threshold value and indicates a positive justification action if the phase value exceeds a second threshold value which is higher than the first threshold value.

An exemplary embodiment of the invention will be further explained in the following with reference to the Figures, in which.

DETAILED DESCRIPTION OF THE PREFERRED EMBODIMENT

Figure 1:
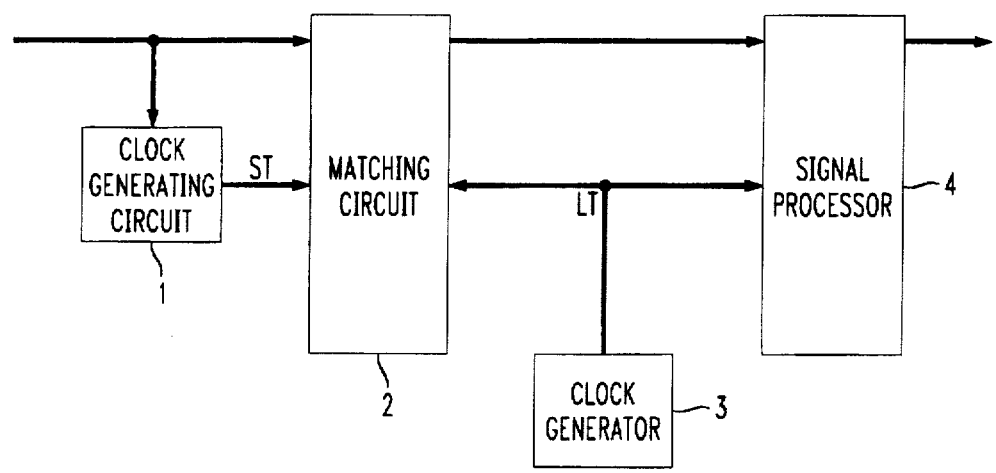
FIG. 1 shows a block circuit diagram of a transmission system of the synchronous digital hierarchy.
Figure 2:
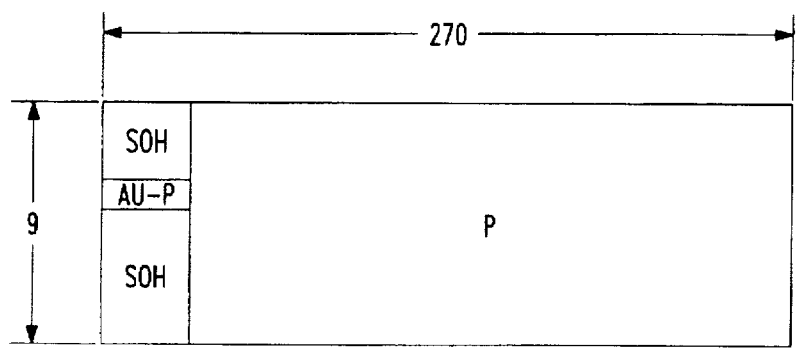
FIG. 2 shows a diagram of an STM-1 frame to be processed in the transmission system shown in FIG. 1.

The block circuit diagram of a digital synchronous hierarchy transmission system shown in FIG. 1 represents a clock generating circuit 1, a matching circuit 2, a clock generator 3 and a device 4 for further processing the signal supplied by the matching circuit 2. The incoming frame-synchronized signal may be, for example, an STM-1 signal of the digital synchronous hierarchy. The STM-1 signal is frame structured and further explained in CCITT Recommendation G.709. An STM-1 frame is shown diagrammatically in FIG. 2. The frame comprises 270 columns and 9 rows (270 bytes per row). In the rows 1 to 3 and 5 to 9, in the columns 1 to 9, for example, control and error detection information is contained. This structure is denoted Section Overhead (SOH). Further control information denoted AU-pointer (AU-P) is inserted into the fourth row from columns 1 to 9. The remaining columns and rows carry the payload which is denoted STM-1 payload (P).

In a clock generating circuit 1 (FIG. 1) a write clock signal ST is derived from the STM-1 signal. The write clock signal ST is applied, as is the STM-1 signal, to the matching circuit 2 which further receives a read clock signal LT from the clock generator 3. In the matching circuit 2 the incoming data of the STM-1 signal are matched with the read clock signal LT. Frequency and/or phase fluctuations between the incoming and outgoing STM-1 signals are thus equalized. During this matching or equalization there are justification actions as a result of which a byte is added to the outgoing STM-1 signal or removed therefrom. The outgoing signal applied to device 4 initiates, for example, an evaluation of the SOH data, a subdivision of the STM-1 signal into various subordinated signals transported in the STM-1 signal, or inserts the justification indication bytes at positions provided for this purpose (according to CCITT Recommendation G.709). The device 4 then only needs to receive the read clock signal LT from the clock generator 3.

Figure 3:
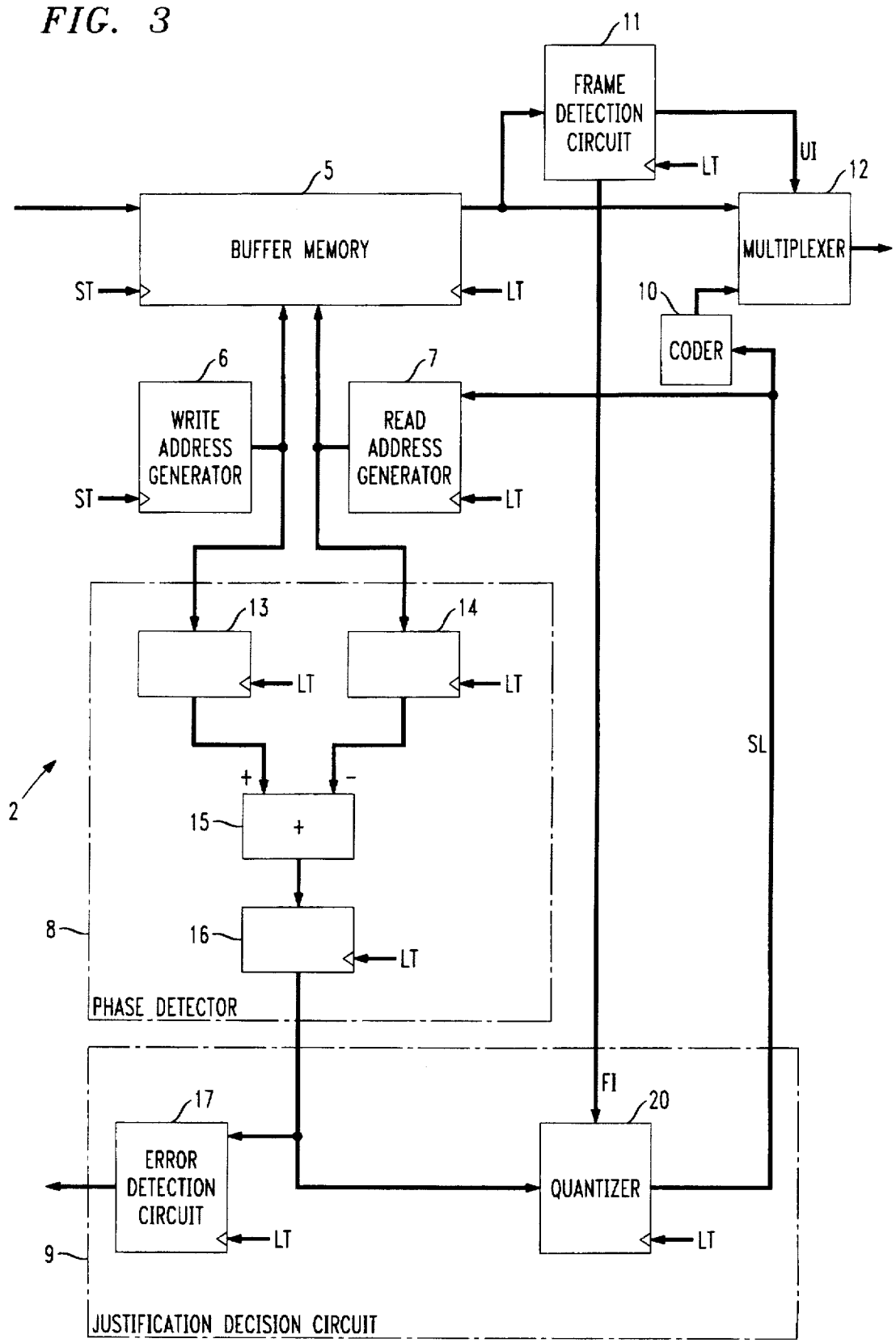
FIG. 3 shows a matching circuit used in the transmission system shown in FIG. 1

The matching circuit 2 of which a detailed version is shown in FIG. 3 comprises a buffer memory 5, a write address generator 6, a read address generator 7, a phase detector 8, a justification decision circuit 9, a coder 10, a frame detection circuit 11 and a multiplexer 12. The write address generator 6 which is arranged, for example, as a modulo-4 counter, receives the write clock signal ST and generates a write address with each clock signal. The write addresses generated according to the one-bit Gray code are cyclically repeated. The write addresses are applied to the buffer memory 5 and a register 13 which receives the read clock signal LT and is included in the phase detector 8. The buffer memory 5 further receives the write clock signal ST for the writing operation and the read clock signal LT for the reading operation. For the execution of the reading operation the read address generator 7, which may also be arranged as a modulo-4 counter and receives the read clock signal LT, applies read addresses to the buffer memory 5. The read address generator 7 further receives a control signal SL from the justification decision circuit 9. If the control signal SL denotes a positive justification action, the most recently generated read address is issued once more. If the control signal SL denotes a negative justification action, the read address that would actually follow is skipped.

The read address sequence is applied not only to the buffer memory 5 but also to a further register 14 which receives the read clock signal LT and also forms part of the phase detector 8. The write address buffered in the register 13 is applied to a first input of a subtracter 15 included in the phase detector 8. The second input of the subtracter 15 is supplied with the read address buffered in the register 14. The subtracter 15 subtracts the read address from the write address and forms a phase value which is buffered in a following register 16. The register 16 is a circuit element of the phase detector 8 and is supplied with the read clock signal LT.

The register 13 is used for synchronizing the write address with the read clock. If a change of the write address coincides with a writing instant in register 13, the write address can often not be written correctly. For example, if a first bit position of the write address has already changed at the writing instant, but a second bit position of the write address has not, an erroneous write address will be the result. In order to minimize this error, the write and read address generators 6 and 7 generate write and read addresses according to the one-bit Gray code. In the Gray code a change in two sequential addresses is effected only at one bit position.

The output of the register 16, which is also the output of the phase detector 8, is connected to the input of the justification decision circuit 9. This justification decision circuit 9 comprises an error detection circuit 17 and a quantizer 20. The error detection circuit 17 and the quantizer 20, not further described here, receive a phase value from the register 16 and the quantizer 20 forms the control signal SL and receives at a specific instant a release pulse FI in addition to the read clock signal LT. An exemplary embodiment for an error detection circuit 17 is discussed in DE-A1-42 05 959. The error detection circuit 17 further receives the read clock signal LT and indicates whether the buffer memory 5 has underflown or overflown.

When the release pulse FI is available, the justification decision is made. The quantizer 20 compares the phase value coming from register 16 with a first and with a second threshold value. The first threshold value corresponds to a lower occupancy level of the buffer memory 5 and a second threshold value to an upper occupancy level of the buffer memory 5. If the phase value coming from register 16 falls short of the first threshold value, a negative justification action is to take place and the control signal SL generated by the quantizer contains a message about a negative justification action. If the phase value coming from the register 16 exceeds the second threshold value, the control signal SL generated by the quantizer 20 contains a message about a positive justification action.

A negative justification action is to take place if the frequency of the read clock signal LT is smaller than the frequency of the write clock signal ST. If the frequency of the read clock signal LT exceeds that of the write clock signal, a positive justification action is to be effected. In the case of a negative justification action, the frame of the outgoing STM-1 signal is shortened by one byte at a specific position and in the case of a positive justification action the frame of the outgoing signal is lengthened at a specific position. This is achieved by the read address generator 7 which, if the control signal SL changes, either generates a read address twice or skips a read address.

Figure 4:
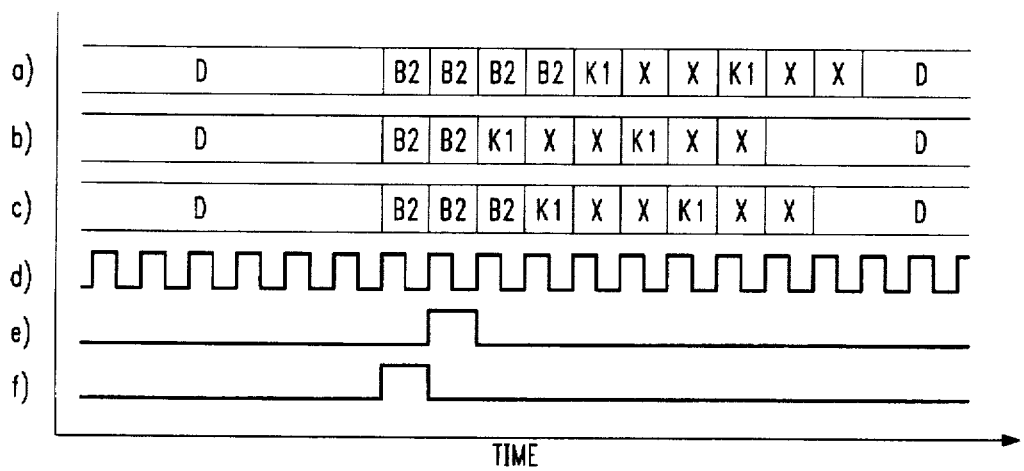
FIG. 4 shows diagrammatically outlined signals that may occur in the matching circuit shown in FIG. 3.

This shortening of the STM-1 signal can be shown with reference to the signals diagrammatically outlined in FIG. 4. The outlines a to c represent bytes of the STM-1 frame. The first byte in the fifth row (first column) of the STM-1 frame is the first B2 byte. If no justification action is effected, two further B2 bytes, one K1 byte, two X bytes, a further K1 byte and two further X bytes (see outline c in FIG. 4) will follow. The B2 bytes in the STM-1 frame contain information which has already been detected before. With a positive justification action (compare outline a in FIG. 4) a further B2-byte is generated before the first K1 byte. The third B2 byte is then read once more. With a negative justification action the third B2 byte is omitted (compare outline b in FIG. 4). One read address is then skipped.

Furthermore, FIG. 4 shows a outline d of the read clock signal LT and an outline f of the release pulse FI.

The release pulse FI for the quantizer 20 is generated by the frame detection circuit 11 which receives the read clock signal LT and receives the data stream coming from the buffer memory 5. Such a frame detection circuit 11 recognizes the beginning of a frame of an STM-1 signal and counts the bytes of the STM-1 frame. If a counter included in the frame detection circuit 11 reaches a count corresponding to the beginning of the predefined structure (first byte of the fifth row of the STM-1 frame or first B2 byte), the frame detection circuit 11 generates the release pulse. When the second B2 byte occurs (second byte in the fifth row of the STM-1 frame), a change-over signal UI is generated by the frame detection circuit 11 (compare signal shape e in FIG. 4) for the multiplexer 12.

The first input of the multiplexer 12 is connected to the output of the buffer memory 5 and the second input of the multiplexer 12 is connected to the coder 10 which receives the control signal SL. Not until the occurrence of the change-over signal UI is the second input of the multiplexer 12 connected to its output. Otherwise, the first input of the multiplexer 12 is coupled to its output. The coder 10 produces a code word which indicates whether a positive, negative or no justification action takes place. This code word is interleaved as a second B2 byte into the outgoing STM-1 signal by means of the multiplexer 12 and the frame detection circuit 11.

I claim:

1. A transmission system (2) comprising a matching circuit for equalizing frequency and/or phase variations between an incoming and an outgoing fame synchronized signal, the matching circuit comprising:

a buffer memory (5) to buffer the data of the incoming signal, a write address generator (6) generating cyclic write addresses to control the writing in the buffer memory;

a read address generator (7) generating cyclic read addresses to control the reading from the buffer memory (5), wherein the read address generator, upon receiving a control signal corresponding to a predefined structure of each frame of the outgoing signal, generates at least a double read address when the control signal indicates a positive justification action and skips at least one read address when the control signal indicates negative Justification action.

a justification decision circuit coupled to the read and write address generators and which generates the control signal.

2. Transmission system as claimed in claim 1, characterized in that the read and write address generators are coupled to the justification decision circuit via a phase detector for forming a phase value from a read address and a write address, which justification decision circuit (9) is provided to generate, during each frame of the outgoing signal, at least once the control signal which indicates a negative justification action if a phase value continues to be below a first threshold value and indicates a positive justification action if the phase value exceeds a second threshold value which is higher than the first threshold value.

3. Transmission system as claimed in claim 2, characterized in that the justification decision circuit (9) comprises a quantizer (20) which is provided to compare for each frame the phase value with the first or second threshold value.

4. Transmission system as claimed in claim 2, characterized in that a multiplexer (12) is provided to receive the outgoing frame synchronized signal and a sequence of code words produced by a coder (10), in that the coder (10) is provided to generate a sequence of code words from the control signal which control signal indicates either a positive or a negative or no justification action, and in that the frame detection circuit (11) is provided to generate a switching pulse which, when a predefined byte of a frame is present on an input of the multiplexer (12), causes a code word to be transferred to an output of the multiplexer (12).

5. Transmission system as claimed in claims 1, characterized in that the write and read address generators (6, 7) are provided to form write and read addresses coded by a one-step code and in that the phase detector (8) comprises a subtracter (15) which is provided to receive the read and write addresses and to form a sequence of phase values.

6. Transmission system as claimed in claims 1, characterized in that the frame synchronized signal is an STM-1 signal of the synchronous digital hierarchy and in that the predefined structure is the first byte (first column) in the fifth row of the STM-1 frame.

7. Matching circuit (2) for equalizing frequency and/or phase variations between an incoming and an outgoing frame synchronized signal, the matching circuit comprising:

a buffer memory (5) to buffer the data of the incoming signal, a write address generator (6) generating cyclic write addresses to control the writing in the buffer memory;

a read address generator (7) generating cyclic read addresses to control the reading from the buffer memory (5), wherein the read address generator, upon receiving a control signal corresponding to a predefined structure of each frame of the outgoing signal, generates at least a double read address when the control signal indicates a positive justification action and skips at least one read address when the control signal indicates negative justification action, a justification decision circuit coupled to the read and write address generators and which generates the control signal.

8. Matching circuit as claimed in claim 7, characterized in that the read and write address generators are coupled to the justification decision circuit (9) via a phase detector for forming a phase value from a read address and a write address, which justification decision circuit (9) is provided to generate, during each frame of the outgoing signal, at least once the control signal which indicates a negative justification action if a phase value lies below a first threshold value and indicates a positive justification action if the phase value exceeds a second threshold value which is higher than the first threshold value.

9. A transmission system comprising a matching circuit for equalizing frequency and/or phase variations between an incoming and an outgoing frame synchronized signal, the matching circuit comprising:

a buffer memory to buffer the data of the incoming signal, a write address generator generating cyclic write addresses to control writing in the buffer memory, a read address generator generating cyclic read addresses to control reading from the buffer memory, a justification decision circuit coupled to the read and write address generators which generates the control signal and provides the control signal to the read address generator, a phase detector, coupling the read and write address generators to the justification decision circuit, for forming a phase value from a read address and a write address, wherein the justification decision circuit generates, during each frame of the outgoing frame synchronized signal, a negative control signal if the phase value is below a first threshold value and a positive control signal if the phase value exceeds a second threshold value which is higher than the first threshold value, and a frame detection circuit coupled to the buffer memory to receive the outgoing synchronized signal and to detect a predefined protocol structure.

10. A transmission system comprising a matching circuit for equalizing frequency and/or phase variations between an incoming and an outgoing frame synchronized signal, the matching circuit comprising:

a buffer memory to buffer the data of the incoming signal, a write address generator generating cyclic write addresses to control writing in the buffer memory, a read address generator generating cyclic read addresses to control reading from the buffer memory, a justification decision circuit coupled to the read and write address generators which generates a control signal and provides the control signal to the read address generator, a phase detector, coupling the read and write address generators to the justification decision circuit, for forming a phase value from a read address and a write address, wherein the justification decision circuit generates, during each frame of the outgoing signal, the control signal indicating negative justification action if the phase value is below a first threshold value and the control signal indicating positive justification action if the phase value exceeds a second threshold value which is higher than the first threshold value, a frame detection circuit coupled to the buffer memory to receive the outgoing synchronized signal and detect a predefined structure, wherein the justification decision circuit comprises a quantizer which compares, for each frame, the phase value with the first and second threshold values, and wherein the frame detection circuit generates a release pulse for the quantizer which signals the quantizer to generate the control signal.

* * * * *